J. J. STEVENSON.
PLANT PROTECTOR.
APPLICATION FILED SEPT. 5, 1918.
1,299,870.
Patented Apr. 8, 1919.
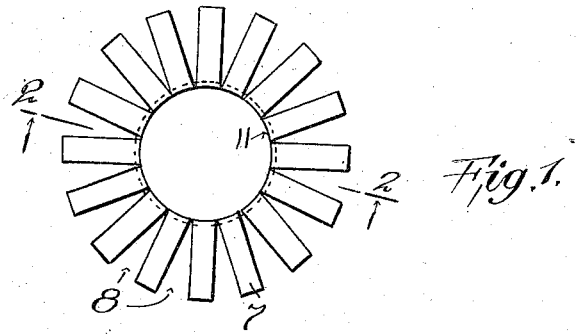
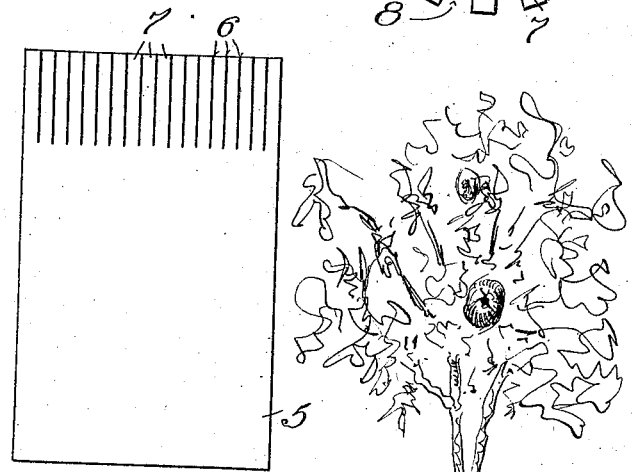
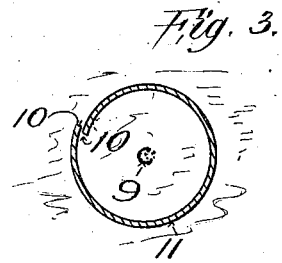
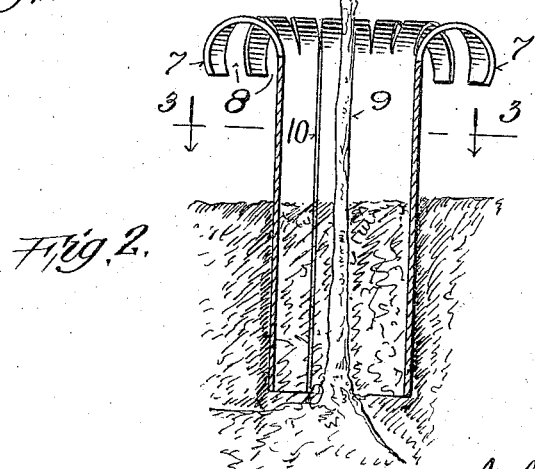
Inventor
John J. Stevenson
by his atty Samuel E. Darby

UNITED STATES PATENT OFFICE.

JOHN J. STEVENSON, OF MUSKEGON, MICHIGAN, ASSIGNOR OF ONE-HALF TO A. M. LARSEN, OF MUSKEGON, MICHIGAN.

PLANT-PROTECTOR.

1,299,870.

Specification of Letters Patent.   Patented Apr. 8, 1919.

Application filed September 5, 1918.   Serial No. 252,793.

*To all whom it may concern:*

Be it known that I, JOHN J. STEVENSON, a citizen of the United States, residing at Muskegon, county of Muskegon, State of Michigan, have made a certain new and useful Invention in Plant-Protectors, of which the following is a specification.

This invention relates to plant protectors.

The object of the invention is to provide a device for protecting plants against the ravages of cut worms and other insects.

A further object of the invention is to provide a protecting device for plants which is simple in structure, economical to manufacture, easily applied to or removed from the plants, and which is efficient in operation.

Other objects of the invention will appear more fully hereinafter.

The invention consists substantially in the construction, combination, location, and arrangement of parts, all as will be more fully hereinafter set forth, as shown in the accompanying drawing, and finally pointed out in the appended claim.

In the accompanying drawing:—

Figure 1 is an end view of a plant protector constructed in accordance with the principles of my invention.

Fig. 2 is a view in elevation, partly in vertical section, showing the application of a plant protector embodying my invention to a plant.

Fig. 3 is a view in section on the line 3, 3, Fig. 2, looking in the direction of the arrows.

Fig. 4 is a view illustrating a sheet of material suitably slit or cut preparatory to forming a protector in accordance with my invention.

The same part is designated by the same reference numeral wherever it occurs through the several views.

In many sections of the country cut worms and other insects are very destructive to young and tender plants, such for example as tomato, cabbage, and other vegetable plants, the worms coming out of the ground and gnawing the plants off just a little above the surface of the ground. Various methods are resorted to to prevent damage from this source to plants. One commonly employed method is to use Paris-green, or other poisonous solution or powder. Another and perhaps a more common method is to wrap pieces or strips of paper, cloth or other material about the stalks of the plants to be protected. Still other expedients are also employed to more or less extent but none of these methods have heretofore proven altogether satisfactory or successful. The worms or other insects will not always take the poison and they frequently succeed in crawling under or over, or penetrating through the wrappings applied to the stems or stalks of the plants. Various forms of shields have been proposed to inclose the stalks or stems of the plants, but so far as I am aware no form of shield has proved effective or satisfactory, being either too expensive or difficult to apply, or not efficient in arresting or preventing the ravages of the worms or other insects.

It is among the special purposes of my present invention to provide a protecting device or shield for the stems or stalks of young and tender plants, which is economical to manufacture, which is efficient in the accomplishment of its protecting functions, and which may be easily and readily applied to and removed from the stem or stalk of the plant and used over and over again.

In carrying out my invention I propose to employ sheet metal, such for example as tin, although other metals may be employed, but which should be sufficiently thin and flexible as to permit the sheet to be easily rolled into cylindrical form for application around the stem or stalk of the plant, so as to form a protecting shield therefor, and the edges of the cylindrical or tubular protector pressed together to form a substantially closed cylinder, by merely exerting sufficient pressure of the fingers thereto. The material to be employed should possess sufficient stiffness to enable the short section of the tubular protector to be forced down endwise into the soil after being applied around the stem or stalk of the plant. Such a protector shields and protects the stem or stalk of a plant from attack of cut worms or other insects, when the crack at the edges of the tubular protector is sufficiently closed as above explained to prevent the insects from entering therethrough, and the protector is designed to be inserted a sufficient depth into the soil to prevent the worms or insects from crawling under and into the interior of the protector. At its upper or top end the tubular protector is constructed to prevent the worms or insects crawling thereover.

Referring to the accompanying drawing, reference numeral 5 designates a sheet of suitable material, such for example as sheet tin, from which the protector is to be made. Ordinarily this sheet is cut out into generally rectangular blanks and a series of slits 6 are formed or cut into one end of the blank forming flexible tongues 7 therein. These slits and tongues are formed in that end of the blank which constitutes the outer or upper end of the protector when completed and applied around the stem or stalk of a plant. The tongues 7 are then bent or curved outwardly and downwardly as most clearly shown in Fig. 2, the spaces 8 between them being insufficient to permit the passage therethrough of the worms or insects attempting to crawl up the outer surface of the protector when once applied to the stem or stalk of the plant, and the outwardly and downwardly curved tongues forming something in the nature of a mushroom head constituting an impassible barrier to prevent the worms or insects from crawling over the upper end of the protector when once applied for use. The blank 5 with the tongues 7 bend outwardly and downwardly therefrom, as above explained, is then bent by hand or otherwise into cylindrical shape while being applied or after application to and around the stem or stalk 9 of the plant to be protected until the edges 10 thereof are brought sufficiently close together or into such proximity to each other as to prevent the worms or insects from crawling therethrough, as clearly indicated in Fig. 3. A tubular protecting device is thus formed and applied around the stem or stalk of the plant to be protected, the body portion 11 being cylindrical, and open at each end, one end, namely, the upper end, having the mushroom head formation, as above explained. The bending or rolling of the blank sheet into tubular form can be readily, quickly, and easily accomplished by hand, and when accomplished the device is pushed or shoved down into the soil as clearly indicated in Fig. 2 to the desired depth. The protecting shield constructed and applied as above described may be easily and readily removed from around the stem or stalk of the plant when the latter is sufficiently large or old enough, or after the expiration of the season during which the worms or insects accomplish their destructive work. The removed protectors or shields may then be preserved for repeated use over again with other plants or other crops.

Having now set forth the objects and nature of my invention, and a structure embodying the principles thereof, what I claim as new and useful and of my own invention, and desire to secure by Letters Patent of the United States, is:—

A protecting shield for the stems or stalks of plants consisting of a one piece sheet of flexible material provided with a plurality of longitudinally extending slits at one end thereof, extending parallel to each other a short distance of the length of said sheet of material to thereby form tongues at the end of said sheet of material, said sheet being bent into tubular form to surround the stem or stalk to be protected, and said tongues bent radially outwardly and downwardly from the cylindrical body portion of the tube so formed, substantially as and for the purpose set forth.

In testimony whereof I have hereunto set my hand on this 3rd day of August, A. D. 1918.

JOHN J. STEVENSON.